United States Patent [19]

Kubica

[11] Patent Number: 5,796,919
[45] Date of Patent: Aug. 18, 1998

[54] METHOD OF CONSTRUCTING AND DESIGNING FUZZY CONTROLLERS

[76] Inventor: Eric Gregory Kubica, 380 Erb Street West, Apartment #105, Waterloo, Ontario, Canada, N2L 1W6

[21] Appl. No.: 729,758

[22] Filed: Oct. 7, 1996

[51] Int. Cl.$^6$ .............................. G06G 7/00; G06F 17/00
[52] U.S. Cl. ................... 395/3; 706/1; 706/900; 706/52; 706/59
[58] Field of Search ................. 395/3, 900, 61, 395/51, 75

[56] References Cited

PUBLICATIONS

Galichet et al. "Fuzzy Controllers: Synthesis and Equivalences" IEEE Transactions on Fuzzy Systems vol. 3 No. 2, May 1995.

Hasan et al. "Design and Implementation of a Fuzzy Controller Based Automatic Voltage Regulator for a Synchronous Generator" IEEE Transactions on Energy Conversion vol. 9 No. 3, Sep. 1994.

Heckenthaler et al. "Computation of Basic Fuzzy Controllers by Approximation of Time–Optimal Controllers" Computer–Aided Control Systems Design, 1994 Symposium.

*Primary Examiner*—Allen R. MacDonald
*Assistant Examiner*—Jason W. Rhodes
*Attorney, Agent, or Firm*—Howard & Howard

[57] ABSTRACT

A method of constructing and designing a fuzzy controller is developed based on converting a finite dimensional linear controller to a fuzzy controller. After the fuzzy controller is created, it can be enhanced using heuristic knowledge. The fuzzy controller is constructed or designed using a microprocessor to calculate a defuzzified output based on singleton fuzzification, product inferencing and centroidal defuzzification. A fuzzy controller can be created much more quickly and accurately than with previous methods.

15 Claims, 2 Drawing Sheets

---

Choosing input membership functions so that a sum of membership grades for a particular input will be unity and each membership grade will vary linearly with the input over the range of that particular membership function.

↓

Choosing a fuzzy associative memory so that it encompasses all possible combinations of input sets.

↓

Choosing output membership functions as functions of equal area

↓

Calculating a defuzzied output based on singleton fuzzification and centroidal defuzzification.

Fig-1

| Choosing input membership functions so that a sum of membership grades for a particular input will be unity and each membership grade will vary linearly with the input over the range of that particular membership function. |
|---|

↓

| Choosing a fuzzy associative memory so that it encompasses all possible combinations of input sets. |
|---|

↓

| Choosing output membership functions as functions of equal area |
|---|

↓

| Calculating a defuzzied output based on singleton fuzzification and centroidal defuzzification. |
|---|

METHOD OF CONSTRUCTING AND DESIGNING FUZZY CONTROLLERS

BACKGROUND OF THE INVENTION

1. Field of the Invention

This invention relates to a method of constructing and to a method of designing multi-input, multi-output fuzzy controllers for a microprocessor based control system utilizing a previously designed linear controller for said system. More particularly, a linear controller is converted to a fuzzy controller.

2. Description of the Prior Art

For approximately the past twenty-five years, fuzzy control has been highly touted as a method which can be employed for difficult nonlinear and poorly defined control problems. It is a highly flexible method which has been used successfully in a variety of situations including household appliances, electronic devices and the automotive sector. Productive applications of fuzzy control can usually be attributed to its ability to encode structured knowledge or heuristics into its framework, not to mention that fuzzy systems have been shown capable of universal function approximation (see C. C. Jou, "On the Mapping Capabilities of Fuzzy Inference Systems", International Joint Conference on Neural Networks, Vol. 2, 1992, pp. 708–713). However, in its most general form, a fuzzy controller is inherently nonlinear and suffers, like other nonlinear controllers, in that design and construction methods are scarce.

It is known that a fuzzy proportional-derivative (PD) controller can be formulated in a way that is similar to a linear PD controller (see T. Brehm and K. S. Rattan, "The Classical Controller: A Special Case of the Fuzzy Logic Controller", Proc. of the 33rd Conference on Decision and Control, Vol. 3, 1994, pp. 4128–4129). However, the equivalence referred to was not exact since a nonlinear term was neglected. Similarly, in Ying, et al., "Fuzzy Control Theory: A Nonlinear Case", Automatica, Vol. 26, No. 3, 1990, pp. 513–520, it is shown that a fuzzy proportional-integral (PI) controller can be made equivalent to a linear PI controller based on various constraints. Several other papers appear in the literature which deal with linear fuzzy control. For example, in Siler, et al., "Fuzzy Control Theory: The Linear Case", Fuzzy Sets and Systems, No. 33, 1989, pp. 275–290, it has been shown that a fuzzy PI controller can be equivalent to a non-fuzzy PI controller when logical definitions are mixed from Zadeh, probabilistic and Lukasiewicz logics. Another paper by Buckley, et al. entitled "Fuzzy Controller Theory: Limit Theorems for Linear Fuzzy Control Rules", Automatica, Vol. 25, No. 3, 1989, pp. 469–472, it is shown that the defuzzified output becomes a linear function of the input as the number of rules grow.

In Galichet, et al., "Fuzzy Controllers: Synthesis and Equivalences", IEEE Transactions on Fuzzy Systems, Vol. 3, No. 2, 1995, pp. 140–148, a fuzzy PI controller is theoretically shown to be equivalent to a linear PI controller.

SUMMARY OF THE INVENTION

It is an object of the present invention to provide a method of constructing or designing a fuzzy controller from a linear controller. It is a further object of the present invention to provide an algorithm which allows the conversion to take place with as few as two fuzzy sets spanning each of the inputs. It is a further object of the invention to provide a method of constructing or designing a fuzzy controller that can be readily enhanced.

The present invention provides a method of constructing multi-input fuzzy controllers for a microprocessor based control system, said system controlling a plant, said method being based on a finite dimensional linear controller for said system, said method comprising:

(a) choosing input membership functions so that a sum of membership grades for a particular input will be unity and each membership grade will vary linearly with the input over the range of that particular membership function;

(b) choosing a fuzzy associative memory so that it encompasses all possible combinations of input sets;

(c) choosing output membership functions as symmetrical unimodal functions of equal area; and (d) using said microprocessor to calculate a defuzzified output based on singleton fuzzification, product inferencing and centroidal defuzzification;

thereby converting said linear controller to an equivalent fuzzy controller.

The present invention provides a method of designing multi-input fuzzy controllers for a microprocessor based control system, said system controlling a plant, said method being based on a finite dimensional linear controller for said system, said method comprising:

(a) choosing input membership functions so that a sum of membership grades for a particular input will be unity and each membership grade will vary linearly with the input over the range of that particular membership function;

(b) choosing a fuzzy associative memory so that it encompasses all possible combinations of input sets;

(c) choosing output membership functions as symmetrical unimodal functions of equal area; and (d) using said microprocessor to calculate a defuzzified output based on singleton fuzzification, product inferencing and centroidal defuzzification;

thereby converting said linear controller to an equivalent fuzzy controller.

DESCRIPTION OF A PREFERRED EMBODIMENT

In the process of providing a mapping from a linear controller to a fuzzy controller, an algorithm is developed which allows this conversion to take place with as few as two fuzzy sets spanning each of the inputs. It could be argued, however, that if the linear control strategy provided adequate performance, then the extension to a fuzzy domain would be pointless. However, this mapping presents a unique opportunity such that it is possible to see what the linear controller is "thinking" since the control actions of a fuzzy controller can be thought of in linguistic terms. As well, often situations arise where linear control only satisfies performance criteria in a specific neighbourhood. Casting the controller into a fuzzy domain allows linear control action around the operating point and fuzzy heuristics to be utilized elsewhere. With this approach, local stability can be guaranteed which is rarely possible to show for a given fuzzy controller.

Deterministic Fuzzy Control (DFC) is a new tool for the design and implementation of multi-input multi-output fuzzy logic control algorithms. DFC facilitates the automatic generation of a complete fuzzy controller from a set of finite dimensional linear controller parameters for both real-time and off-line applications. DFC computes the entire fuzzy rule-base along with the corresponding output membership functions which are unprecedented fuzzy controller design tool capabilities. The initial implementation of this algorithm has been PC based with a Windows 3.x/Windows 95 Graphical User Interface (GUI) and a multi I/O board to provide the corresponding hardware interface. However, this same algorithm could also be used to generate fuzzy controllers for microcontrollers or any other microprocessor based control systems.

DFC has been developed to operate in the standard state feedback configuration so that a fuzzy controller could easily replace an existing linear controller. In this way, the plant or process (plant or process is that part of the system that is controlled by the fuzzy controller) states (measured and/or estimated) are fed to the controller which computes the new input to the plant in the case of a regulator, or is offset by a reference input in the case of a tracking problem. Thus, linear control parameters (e.g. proportional, integral and derivative gains, state feedback matrix, etc.) are required input for the DFC. The user is allowed to enter multiple fuzzy controllers such that any combination of the inputs can be used to generate a specific output while controllers with the same output selected will have the collective outputs summed. The only other parameters that are necessary for the DFC to be generated pertain the membership functions for the input. This requires the user to input the number, spacing attributes and the range over which the inputs will be effective. At this point, the DFC rule-base and output membership functions are computed as described in the accompanying document such that a fuzzy controller is produced with identical performance and stability to the linear controller that was used to generate it. Not only is fuzzy controller performance and stability generally very difficult to ascertain and/or guarantee, but the DFC presented here can produce useful and stable fuzzy controllers in a significantly shorter time frame than would be required if it were produced manually.

Once the DFC has been generated, heuristic knowledge can easily be incorporated to enhance the performance of the controller. In the existing GUI, the user can modify the output set that a given rule uses by selecting that output with the mouse which then displays a list of all possible output sets for that rule. Once a new output set has been selected, the controller will function linearly except in the vicinity of those rules which have been modified. In this way, the only rules that the controller designer has to be concerned with are those rules where linear control does not provide adequate performance which again, decreases the controller design time. The linear controller can be pre-existing or can be designed just prior to designing the fuzzy controller.

Fuzzy Control

The computational structure of a fuzzy controller requires a number of steps to be performed for an output to be determined. The complete process requires the fuzzy controller to fuzzify crisp real valued inputs, perform inferencing on the fuzzified inputs in terms of a fuzzy associative memory (or rule-base) and then defuzzify the output so that a real valued output is produced. The following definitions are required for subsequent development.

Definition: Intersection/t-norm

A broad class of models for the intersection of two fuzzy sets can be formed by triangular or t-norms. A t-norm * is a function of two arguments $|0.1|\times|0.1|\rightarrow|0.1|$ and corresponds to the logical connective and. Several t-norm operators can be found in the literature |8| although the present work utilises the product operator, defined for fuzzy sets A and B, is given as:

$$\mu_A(\cdot)*\mu_B(\cdot):=\mu_A(\cdot)\mu_B(\cdot) \qquad (1)$$

Definition: Fuzzy Cartesian Product

If $A_1, \ldots, A_n$ are fuzzy sets in $X_1, \ldots, X_n$, then the fuzzy Cartesian product of the of the fuzzy sets $A_i$ is a fuzzy set in the product space $X_1 x \ldots xX_n$ with the membership function $$\mu_{A_1 x \ldots xA_n}(x_1, \ldots, x_n) = \mu_{A_1}(x_1)* \ldots *\mu_{A_n}(x_n). \qquad (2)$$

Definition: Fuzzy Relation

A fuzzy relation is a subset of the fuzzy Cartesian product space such that an n-ary fuzzy relation in the product space $X_1 \ldots xX_n$ is expressed as $$R_{X_1 x \ldots xX_n} = \{|(x_1, \ldots, x_n), \mu_R(x_1, \ldots, x_n)|(x_1, \ldots, x_n) \in X_1 x \ldots xX_n\}. \qquad (3)$$

Thus, for each set of elements $(x_1, \ldots, x_n)$, a number in the range [0.1] is assigned which expresses the strength of association between them.

Fuzzification is the process of casting a crisp value into a fuzzy domain. The easiest and most common fuzzification procedure converts a nonfuzzy point in the input space $u=(u_1, \ldots, u_n)^T \in U$ to a fuzzy subset(s) $P_U$ in U via fuzzy singletons. A singleton is a fuzzy set whose support is a single value u such that the membership grade is $\mu(u)=1$ while $\mu(\neq u)=0$.

The fuzzy associative memory (FAM) contains the regionalised mapping from the input fuzzy sets to the output fuzzy sets. It is essentially a bank of fuzzy relations which encode structured knowledge in the form "If Temperature is low then Heat Input should be medium". In this case low and medium represent fuzzy sets defined over the input and output spaces respectively. The way in which the FAM is incorporated into the system is as follows. Let the input vector of crisp values be given by $u=(u_1, \ldots, u_n)^T \in U$ and the input fuzzy sets are denoted by $A_i$ for input i of the $l^{th}$ fuzzy association. The $l^{th}$ output fuzzy set is $B^l$ and the defuzzified output is $y \in Y$ which is a crisp value. Often the FAM is referred to as a fuzzy rule-base such that the generic form of the $l^{th}$ rule is:

$$R^l: \text{IF } u_1 \text{ is } A_1{}^l \text{ and } \ldots \text{ and } u_n \text{ is } A_n{}^l \text{ THEN y is } B^l. \qquad (4)$$

Note that l is not the literal index on the membership function but rather a pointer to the fuzzy set describing input n for the $l^{th}$ association. In a mathematical sense, (4) describes the fuzzy implication $A_1{}^l x \ldots xA_n{}^l \rightarrow B^l$ as a fuzzy relation defined in the Cartesian product space $U_1 x \ldots xU_n xY$. This form can be easily extended to include multi-output systems by expanding the fuzzy implication to point to several outputs sets i.e. $A_1{}^l x \ldots xA_n{}^l \rightarrow B_1{}^l x \ldots xB_m{}^l$ where n and m are the number of inputs and outputs respectively. With the fuzzy implication functions defined as (1), each rule is represented by a fuzzy relation with the membership function:

$$\mu_{A_1{}^l x \ldots xA_n{}^l \rightarrow B^l}(u,y) = \mu_{A_1{}^l x \ldots xA_n{}^l}(u)*\mu_{B^l}(y). \qquad (5)$$

The implementation of the FAM is realised through a fuzzy inference system which maps input fuzzy sets to the antecedent fuzzy sets. This is required since $u_i$ in (4) can only be $A_i$ in a fuzzy sense. Thus, the consequent of each FAM is evaluated by taking the composition o of the fuzzified input sets $A_1'\ldots A_n'$ for a particular input u and the fuzzy relation (implication) $A_1'x \ldots xA_n' \to B'$. In its most general form the compositional operator is expressed as the sup-star composition where "star" denotes the t-norm. Now consider an arbitrary set of inputs in U which are represented by the fuzzy set $P_U$. Each component in the FAM generates an output fuzzy set $P_UoR^l$ based on the rule of compositional inference:

$$\mu_{P_UoR^l}(y) = \sup_{u \in U} [\mu_{P_U}(u) * \mu_{A_1'x\ldots xA_n' \to B^l}(u, y)]. \tag{6}$$

The output of the fuzzy controller as given by (6) is a fuzzy set and must be mapped back to a crisp value for a useful control action to result and this transformation is called defuzzification. One of the most commonly used defuzzification methods is the centre-of-area method which involves computing the overall centroid of the membership functions for all of the M rule outputs. A simplified form of this method can be utilised when the membership functions of the output space are all symmetrical and identically proportioned. In this case the control action can be computed as a weighted average of the centre values ($\overline{B}^l$) of the participating membership functions such that:

$$y_0(u) = \frac{\sum_{l=1}^{M} \overline{B}^l(\mu_{P_UoR^l}(\overline{B}^l))}{\sum_{l=1}^{M} \mu_{P_UoR^l}(\overline{B}^l)}. \tag{7}$$

If singleton fuzzification is used (i.e. $\mu_{P_U}(\hat{u})=1$ for sample $\hat{u}$ and, $\mu_{P_U}(u)=0$ elsewhere), then (6) can be simplified since the supremum occurs at $\hat{u}=u$. Thus, $$\mu_{P_UoR^l}(\overline{B}^l) = \prod_{i=1}^{n} \mu_{A_i'}(u_i)\mu_{B^l}(\overline{B}^l) \tag{8}$$

where $\mu_{B^l}(\overline{B}^l)=1$ due to symmetry in the output sets. This can be substituted into (7) and results in $$y_0(u) = \frac{\sum_{l=1}^{M} \overline{B}^l \left( \prod_{i=1}^{n} \mu_{A_i'}(u_i) \right)}{\sum_{l=1}^{M} \left( \prod_{i=1}^{n} \mu_{A_i'}(u_i) \right)} = \frac{y^N}{y^D}. \tag{9}$$

These basic building blocks of a fuzzy controller are used in the remainder of this paper to establish a link between conventional and fuzzy control.

3. Using Linear Techniques to Construct a Fuzzy Controller

Figure 4:
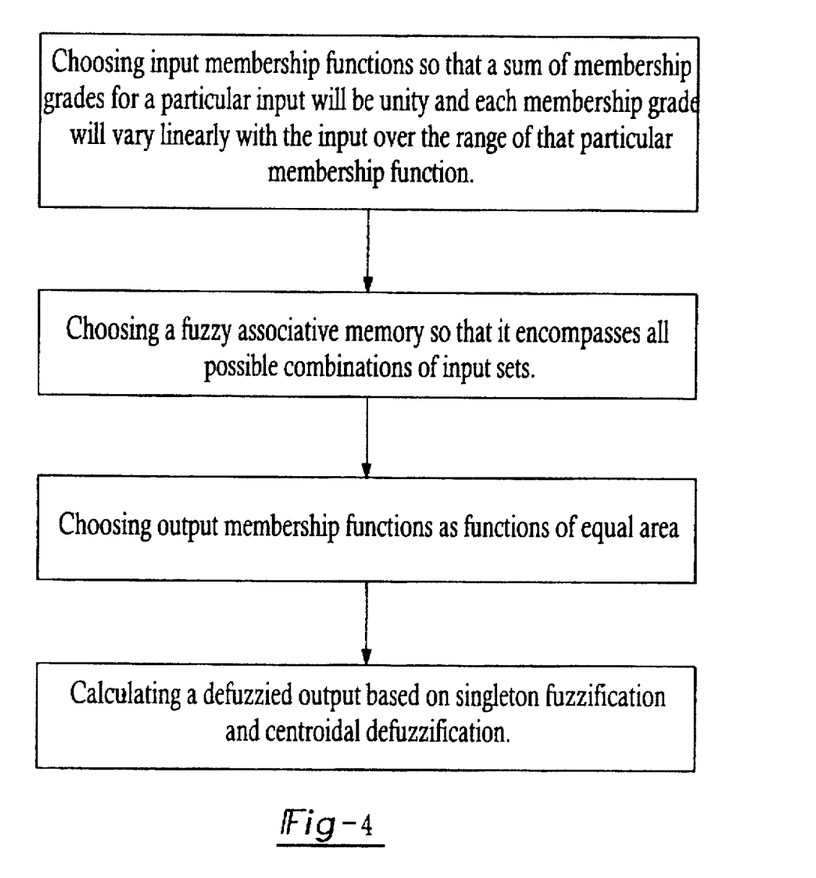
FIG. 4 is a flow chart showing the method of the present invention.

The design of fuzzy controllers has always been somewhat abstract in that it is usually based on intuition and heuristic reasoning. Aside from constructing the FAM, determining appropriate shapes and spans of the input and output fuzzy sets can also require considerable adjustment before satisfactory results are obtained. The objective of this paper is to show that the design of a fuzzy controller can be simplified considerably provided that a linear controller can be constructed for a given plant. It will be shown that a linear controller can be mapped to a simple class of fuzzy controllers utilizing the method shown in FIG. 4 such that the defuzzified output is identical to the linear control law.

The class of linear controllers dealt with in this work is any controller which can be put into the form $$u = K(t)z(x) + c(t) \tag{10}$$

where K is an m×p time varying gain matrix, z(x) is a p×1 vector which is a linear function of the states (any linear function including derivatives and integrals), and c(t) is an m×1 time varying offset vector. Note that in theory p could be infinite so that this approach is not limited to finite dimensional systems. However, from a more practical viewpoint, (10) can represent common control laws such as proportional-integral-derivative (PID) control or time-invariant state feedback control.

The basic premise of the approach presented is to pay particular attention to the points in the input space that satisfy the rules in the FAM exactly. These points can be identified as a special case of (8) such that for a controller operating on the states x∈X:

$$\prod_{i=1}^{n} \mu_{A_i'}(x_i) = \prod_{i=1}^{n} \mu_{A_i'}(\overline{A_i'}) = 1. \tag{11}$$

Under these conditions, the consequence of each part of the FAM is assigned to an output set with its centroid positioned in the output space so that it provides the same defuzzified output as the linear control law with the same inputs. The input membership functions are specified so that the membership grades vary linearly between sets which in turn, guarantees that when a rule in the FAM is not satisfied exactly, then the output is a linear interpolation of the linear control law used to define the centroids of the output sets. These concepts can be stipulated in a more precise manner as follows:

i) Input Membership Functions

The input membership functions are constructed such that the sum of the membership grades for a particular input will be unity. In other words, if the membership functions are specified as $\mu_{A_i'}(x_i)$, where i designates the input, s denotes the particular fuzzy set, $\eta_i$ is the number of fuzzy sets spanning input i with n inputs, this condition can be written as:

$$\sum_{s=0}^{\eta_i-1} \mu_{A_i'}(x_i) = 1, \ 1 \leq i \leq n. \tag{12}$$

Figure 1:
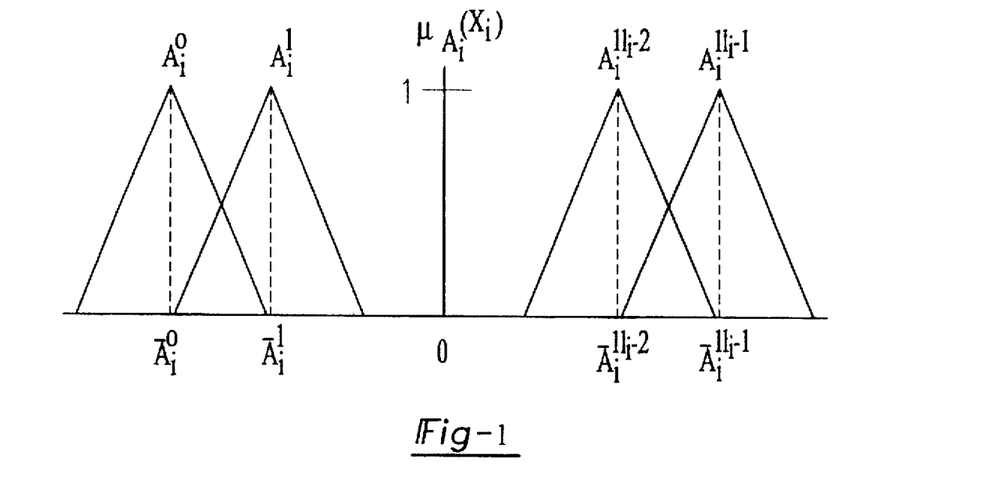
FIG. 1 is a schematic view of input measurement functions.

In addition, the membership functions must vary linearly between one another. Provided that only normal fuzzy sets are used (A is a normal fuzzy set if $$\sup_{x \in X} [\mu_A(x)] = 1),$$

these conditions can only be satisfied with triangular membership functions which overlap at a membership grade of 0.5. This is depicted in FIG. 1 where each set is denoted by $A_i^s$. Note that the sets are not necessarily symmetrical and that they reach their maximum grade of membership at $\overline{A_i^s}$, i.e. $\mu_{A_i^s}(\overline{A_i^s})=1$. With this configuration, (12) can be rearranged so that for all $\overline{A_i^s} \leq x_i \leq \overline{A_i^{s+1}}$, then $\mu_{A_i^{s+1}}(x_i)=1-\mu_{A_i^s}(x_i)$.

The ensuing analysis is valid with any number of fuzzy sets ($\eta_i > 1, \forall i$) spanning each of the inputs. However, at any given instant in time, only two fuzzy sets in each input will have non-zero membership grades with the forementioned conditions. Therefore, without loss of generality, the following analysis will only consider the two fuzzy sets spanning each input with non-zero membership grades so that the subsequent controller formulation can be presented in a more tractable manner.

ii) Fuzzy Associative Memory

The fuzzy associative memory (FAM) or rule-base is derived so that it is full or complete. This means that each combinatorially possible fuzzy association is considered. Hence, the total number of rules (M) in the FAM is equal to the product of the number of fuzzy sets($\eta_i$) spanning each of the n inputs i.e.

$$M = \prod_{i=1}^{n} \eta_i.$$

However, since only two fuzzy sets for each input (these fuzzy sets are denoted by $A_i^0$, $A_i^1$) have non-zero membership grades for a given input vector, the total number of contributing fuzzy associations for an n input system at a particular instant would be $M=2^n$. For simplicity, let the generic fuzzy association given in (4) be represented as an (n+1)-tuple of the form $(A_1^{b_1}, A_2^{b_2}, \ldots, A_n^{b_n}; B^{l-1})$ where $b_i \in \{0,1\}$ and $1 \leq l \leq M$. Note that if the $b_i$ terms are considered to be individual bits of an n digit binary number where $b_1$ is the most significant bit and $b_n$ is the least significant bit, then the rule number in a base 10 number system can define the contributing fuzzy association i.e. $l-1=b_1 \times 2^{n-1}+b_2 \times 2^{n-2}+\ldots+b_n \times 2^0 = (b_1 b_2 \ldots b_n)_{base\ 2}$. Hence, a convenient way to ensure that the contributing portion of the FAM is considered is to list the binary equivalent of the rule numbers which are defined as $0 \leq l \leq 2^n-1$. As an example, consider a three input single output system. In this case, the contributing portion of the FAM would have $2^3=8$ fuzzy associations and the construction of the rule base would proceed as shown in Table 1. The fuzzy associations combine cumulatively to produce the FAM.

TABLE 1

Bitwise FAM construction

| Rule # | (Rule #)$_{base\ 2}$ | Fuzzy Association |
|---|---|---|
| 0 | 0 0 0 | $A_1^0, A_2^0, A_3^0; B^0$ |
| 1 | 0 0 1 | $A_1^0, A_2^0, A_3^1; B^1$ |
| 2 | 0 1 0 | $A_1^0, A_2^1, A_3^0; B^2$ |
| 3 | 0 1 1 | $A_1^0, A_2^1, A_3^1; B^3$ |
| 4 | 1 0 0 | $A_1^1, A_2^0, A_3^0; B^4$ |
| 5 | 1 0 1 | $A_1^1, A_2^0, A_3^1; B^5$ |
| 6 | 1 1 0 | $A_1^1, A_2^1, A_3^0; B^6$ |
| 7 | 1 1 1 | $A_1^1, A_2^1, A_3^1; B^7$ | iii) Output Membership Functions

The output membership functions are chosen as symmetrical unimodal functions all of equal area with centres at $\overline{B}^l$. The net result of this is that the output sets are effectively singletons at $\overline{B}^l$. Note that these sets are indexed by l where $1 \leq l \leq M$ so that a different output set is permitted for each rule in the FAM. The location of the output centroids provides the key to this work in that it directly incorporates the linear control law found in (10). For a multi-input single-output system, these centroids are computed as:

$$\overline{B}^0(t) = k_1(t)\overline{A}_1^0 + k_2(t)\overline{A}_2^0 + \ldots + k_n(t)\overline{A}_n^0 + c(t) \quad (13)$$

$$\overline{B}^1(t) = k_1(t)\overline{A}_1^0 + k_2(t)\overline{A}_2^0 + \ldots + k_n(t)\overline{A}_n^1 + c(t)$$

$$\overline{B}^2(t) = k_1(t)\overline{A}_1^0 + k_2(t)\overline{A}_2^0 + \ldots + k_{n-1}(t)\overline{A}_{n-1}^1 + k_n(t)\overline{A}_n^0 + c(t)$$

$$\ldots$$

$$\overline{B}^{2^n-2}(t) = k_1(t)\overline{A}_1^1 + k_2(t)\overline{A}_2^1 + \ldots + k_{n-1}(t)\overline{A}_{n-1}^1 + k_n(t)\overline{A}_n^0 + c(t)$$

$$\overline{B}^{2^n-1}(t) = k_1(t)\overline{A}_1^1 + k_2(t)\overline{A}_2^1 + \ldots + k_{n-1}(t)\overline{A}_{n-1}^1 + k_n(t)\overline{A}_n^1 + c(t)$$

Note that (13) is for the general time-varying case which would require the positions of the output sets to be re-computed as the linear controller gains change. For simplicity, the remainder of this work will be written without explicitly showing the dependence on time although all of the results will apply to time-varying systems. Hence, the following analyses will appear identical to the case where a time-invariant system is utilised.

The balance of this section focuses on demonstrating that a fuzzy controller implemented as specified above can be put into a general form which in turn, can be shown to be equivalent to the linear control law.

Generalised Linear Fuzzy Control

A general formulation of a fuzzy controller can be derived when the input and output membership functions and the FAM are constructed as discussed above. Under these conditions (9) can easily be modified to include the FAM directly into the defuzzification process. This will be shown by examining two examples which are used to infer the general defuzzified output. The examples are presented in an algorithmic manner to demonstrate the process of converting a linear controller to a fuzzy controller.

EXAMPLE 1

First, consider a single-input (n=1) single-output system. Let the linear control law be given as $u=kz+c$ such that k is a scalar gain, z is a linear function of the plant state (e.g. $z=x_{REF}-x$), and c is an offset. A fuzzy controller which is equivalent to this linear control law can be constructed in the following manner:

Input Membership Functions: The contributing portion of the input space will be spanned by the two fuzzy sets $A_1^0$ and $A_1^1$ which are constructed such that $\mu_{A_1^1}(z)+\mu_{A_1^0}(z)=1$ and their placement in the universe of discourse is assumed to be $\overline{A}_1^0 \leq z \leq \overline{A}_1^1$ where $\mu_{A_1^\rho}(\overline{A}_1^\rho)=1$, $\rho=0,1$. The membership functions will be triangular in shape to provide a linear variation as the input moves between them and the membership grade will be computed as $$\mu_{A_1^0}(z) = \frac{\overline{A}_1^1 - z}{\overline{A}_1^1 - \overline{A}_1^0} = 1 - \mu_{A_1^1}(z). \quad (14)$$

Fuzzy Associative Memory: The FAM will be constructed so that all possible contributing input combinations will be addressed. Using the approach discussed previously to generate these rules of the FAM, the fuzzy associations are given as:

| Rule # | (Rule #)$_{base\ 2}$ | Fuzzy Association |
|---|---|---|
| 0 | 0 | $A_1^0; B^0$ |
| 1 | 1 | $A_1^1; B^1$ |

Output Membership Functions: One output set is utilised for each rule in the FAM so that the number of output sets is equal to $2^n=2^1=2$. As discussed previously, the output membership functions will be fuzzy singletons located at $\overline{B}^0$ and $\overline{B}^1$ for sets $B^0$ and $B^1$ respectively. Application of (13) leads to $$\overline{B}^0 = k\overline{A}_1^0 + c \tag{15}$$

$$\overline{B}^1 = k\overline{A}_1^1 + c$$

Defuzzification: Using the modified centroidal defuzzification given in equation (9), the FAM is incorporated into the summation which results in:

$$y_0 = \frac{\overline{B}^0 \mu_{A_1^0}(z) + \overline{B}^1 \mu_{A_1^1}(z)}{\mu_{A_1^0}(z) + \mu_{A_1^1}(z)} = \frac{y^N}{y^D}. \tag{16}$$

Recall that $\mu_{A_1^1}(z) = 1 - \mu_{A_1^0}(z)$ which leads to $$y_0 = \frac{\overline{B}^1 + (\overline{B}^0 - \overline{B}^1)\mu_{A_1^0}(z)}{1}. \tag{17}$$

Note that (17) is general in the sense that it represents the defuzzified output for a single-input single-output fuzzy controller for the case where the input vector lies in the space mapped by the two fuzzy sets $A_1^0$ and $A_1^1$ where $\overline{A}_1^0 \leq z \leq \overline{A}_1^1$ such that $\mu_{A_1^p}(\overline{A}_1^p) = 1$, $p = 0,1$. Also notice that the shape of the input membership functions has not yet been specifically incorporated into the procedure. Now, to demonstrate that the linear control law is encompassed in the fuzzy controller output, equations (14) and (15) are substituted into (17). This gives $$y_0 = k\overline{A}_1^1 + c + k(\overline{A}_1^0 - \overline{A}_1^1)\left(\frac{\overline{A}_1^1 - z}{\overline{A}_1^1 - \overline{A}_1^0}\right) \tag{18}$$

$$= kz + c$$

which is precisely equal to the linear control law.

EXAMPLE 2

Now consider a two-input (n=2) single output system where the linear control law is given as u=kz+c such that the gain vector $k=[k_1 k_2]$, and $z^T=[z_1 z_2]$ is a linear function of the plant states, and c is a scalar offset. An equivalent fuzzy controller can be constructed as follows:

Input Membership Functions: It will be assumed that the input for each of the n inputs will have non-zero membership grades in only two fuzzy sets $A_i^0$ and $A_i^1$ for $i \in [1,2]$ which are constructed such that $\mu_{A_i^1}(z) + \mu_{A_i^0}(z) = 1$ and positioned in the input space so that $\overline{A}_i^0 \leq z_i \leq \overline{A}_i^1$ where $\mu_{A_i^p}(\overline{A}_i^p)=1$, p=0,1. Again, the membership functions will be triangular in shape to provide a linear variation in the membership grades which are calculated as $$\mu_{A_i^0}(z_i) = \frac{\overline{A}_i^1 - z_i}{\overline{A}_i^1 - \overline{A}_i^0} = 1 - \mu_{A_i^1}(z_i), \quad i = 1, 2. \tag{19}$$

Fuzzy Associative Memory: As before, the FAM will be constructed so that all contributing input combinations will be addressed. The fuzzy associations are given as:

| Rule # | (Rule #)$_{base\ 2}$ | Fuzzy Association |
|---|---|---|
| 0 | 0 0 | $A_1^0, A_2^0; B^0$ |
| 1 | 0 1 | $A_1^0, A_2^1; B^1$ |
| 2 | 1 0 | $A_1^1, A_2^0; B^2$ |
| 3 | 1 1 | $A_1^1, A_2^1; B^3$ |

Output Membership Functions: It is required that one output set be available for each rule in the FAM. In this case, the number of output sets is equal to $2^n = 2^2 = 4$. The output membership functions will be fuzzy singletons located at $\overline{B}^0, \ldots, \overline{B}^{2^n-1}$ for sets $B^0, \ldots, B^{2^n-1}$. Application of the general form of (13) produces $$\overline{B}^0 = k_1\overline{A}_1^0 + k_2\overline{A}_2^0 + c \tag{20}$$

$$\overline{B}^1 = k_1\overline{A}_1^0 + k_2\overline{A}_2^1 + c$$

$$\overline{B}^2 = k_1\overline{A}_1^1 + k_2\overline{A}_2^0 + c$$

$$\overline{B}^3 = k_1\overline{A}_1^1 + k_2\overline{A}_2^1 + c.$$

Defuzzification: The defuzzified output is computed from equation (9) which results in:

$$y_0 = \frac{\overline{B}^0 \mu_{A_1^0}(z_1)\mu_{A_2^0}(z_2) + \overline{B}^1 \mu_{A_1^0}(z_1)\mu_{A_2^1}(z_2) +}{\mu_{A_1^0}(z_1)\mu_{A_2^0}(z_2) + \mu_{A_1^0}(z_1)\mu_{A_2^1}(z_2) +} \\ \frac{\overline{B}^2 \mu_{A_1^1}(z_1)\mu_{A_2^0}(z_2) + \overline{B}^3 \mu_{A_1^1}(z_1)\mu_{A_2^1}(z_2)}{\mu_{A_1^1}(z_1)\mu_{A_2^0}(z_2) + \mu_{A_1^1}(z_1)\mu_{A_2^1}(z_2)} \tag{21}$$

$$= \frac{y^N}{y^D}.$$

Substitution of the input membership function relation $\mu_{A_i^1}(z) + \mu_{A_i^0}(z) = 1$ results in $$y_0 = \frac{\overline{B}^3 + (\overline{B}^1 - \overline{B}^3)\mu_{A_1^0}(z_1) + (\overline{B}^2 - \overline{B}^3)\mu_{A_2^0}(z_2)}{1}. \tag{22}$$

The linear control law can be recovered by substituting (19) and (20) into (22) which leads to:

$$y_0 = k_1\overline{A}_1^1 + k_2\overline{A}_2^2 + c + k_1(\overline{A}_1^0 - \overline{A}_1^1)\left(\frac{\overline{A}_1^1 - z_1}{\overline{A}_1^1 - \overline{A}_1^0}\right) + \tag{23}$$

$$k_2(\overline{A}_2^0 - \overline{A}_2^1)\left(\frac{\overline{A}_2^1 - z_2}{\overline{A}_2^1 - \overline{A}_2^0}\right)$$

$$= k_1 z_1 + k_2 z_2 + c$$

$$= kz + c$$

and thus, the fuzzy controller is identical to the linear control law.

For computational ease, it is worthwhile to note that the denominator term $y^D$ of the defuzzification process (eqs. (17) and (22)) is always equal to unity for the conditions imposed on this system. The following lemma specifies the details.

Lemma 1

For a given input vector $z \in R$, the denominator from the centroidal defuzzification given in (9)

$$y^D = \sum_{\ell=1}^{M}\left(\prod_{i=1}^{n} \mu_{A_\ell}(z_i)\right),$$

is equal to unity $\forall \overline{A}_i^0 \leq z_i \leq \overline{A}_i^{\eta_i - 1}$ provided that:

i) The fuzzy associative memory contains all possible combinations of the input sets such that the number of unique rules would be $$M = \prod_{i=1}^{n} \eta_i$$

where n is the number of inputs and $\eta_i$ is the number of sets spanning input i.

ii) The input sets are normal and the sum of the membership grades for every input is equal to one i.e.

$$\sum_{s=0}^{\eta_i-1} \mu_{A_i s}(z_i) = 1, \ 1 \leq i \leq n.$$

Proof: See Appendix

A generalised formulation can now be developed by observing the similarities in equations (17) and (22). It is given in the following lemma.

Lemma 2

Given an input vector $z \in \mathbb{R}$, the centroidal defuzzification given in (9) can directly incorporate the fuzzy associative memory and be computed as:

$$y_0 = \overline{B}^{2^n-1} + \sum_{i=1}^{n} (\overline{B}^{2^n-1-2^{n-i}} - \overline{B}^{2^n-1}) \mu_{A_i 0}(z_i) \quad (24)$$

provided that the following conditions are satisfied:

i) Same as condition i) in Lemma 1.

ii) Same as condition ii) in Lemma 1.

iii) The output sets are computed based on a vector $k \in \mathbb{R}$ and a constant $c \in \mathbb{R}$ and the centroids of the input sets as shown in (13).

Proof: See Appendix

These two lemmas lead to the following theorem which relates a linear controller to a fuzzy controller in a deterministic way:

Theorem

A fuzzy controller can be constructed which has an identical input/output relationship to a linear controller of the form where K is an m×p time varying gain matrix, z(x) is a p×1 vector which is a linear function of $$u = K(t)z(x) + c(t) \quad (25)$$

the plant states, and c(t) is an m×1 time varying offset vector. The fuzzy controller must conform to the following conditions:

i) Same as condition i) of Lemma 1.

ii) Same as condition ii) of Lemma 1, and the input membership functions are triangular and are calculated as $$\mu_{A_i 0}(z_i) = \frac{\overline{A}_i^1 - z_i}{\overline{A}_i^1 - \overline{A}_i^0} = 1 - \mu_{A_i 1}(z_i), \ i \in \{1, 2, \ldots, n\} \quad (26)$$

iii) Same as condition iii) of Lemma 2.

iv) The modified centroidal defuzzification is used as given in (9).

Proof

From Lemma 1 and Lemma 2 it was shown that for a given input vector $z \in \mathbb{R}$ where $\overline{A}_i^0 \leq z_i \leq \overline{A}_i^1$, the defuzzified output was of the form given in (24). Notice that the two $\overline{B}$ terms in the summation have indexes which differ by $2^{n-i}$ or from $2^{n-1}$ to 1. Under these conditions, the corresponding bit pattern only differs in one of the bits. Thus, (24) becomes $$y_0 = \overline{B}^{2^n-1}(t) + \sum_{i=1}^{n} (k_i(t)\overline{A}_i^0 - k_i(t)\overline{A}_i^1) \mu_{A_i 0}(z_i). \quad (27)$$

Now, substitute the membership function given in condition i):

$$y_0 = \overline{B}^{2^n-1}(t) + \sum_{i=1}^{n} k_i(t) (\overline{A}_i^0 - \overline{A}_i^1) \frac{\overline{A}_i^1 - z_i(x)}{\overline{A}_i^1 - \overline{A}_i^0} \quad (28)$$

$$= \overline{B}^{2^n-1}(t) + \sum_{i=1}^{n} k_i(t) (z_i(x) - \overline{A}_i^1)$$

$$= \overline{B}^{2^n-1}(t) + \sum_{i=1}^{n} k_i(t)z_i(x) - \sum_{i=1}^{n} k_i(t)\overline{A}_i^1.$$

However, $\overline{B}^{2^n-1}$ has the highest index of the output sets so that the binary equivalent is entirely ones. Thus, the defuzzified output can be written as $$y_0 = \left( \sum_{i=1}^{n} k_i(t)\overline{A}_i^1 + c(t) \right) + \sum_{i=1}^{n} k_i(t)z_i(x) - \sum_{i=1}^{n} k_i(t)\overline{A}_i^1 \quad (29)$$

$$= \sum_{i=1}^{n} k_i(t)z_i(x) + c(t)$$

$$= K(t)z(x) + c(t)$$

which is the linear control law. ∎

The preceding theorem is quite functional in that can be used to construct a fuzzy controller based on a linear design. The following section demonstrates how this theorem can be applied to a control problem and how it can be used to identify where a controller designed with the LQR method produces inappropriate control actions.

4. Deterministic Fuzzy Controller Design

Recently, much attention has been directed towards lightweight robotic systems where flexibility of the structural elements poses a complicated control problem. As a simple example, consider a single flexible link robot which consists of a long beam driven by a motor at its base which imparts a torque τ. The beam has a narrow rectangular cross-section such that vibrations occur primarily in the plane of the motor rotation; gravitational effects are ignored. The rigid body motion is given by θ and the relative tip deflection of the beam is given by w. This system has been modelled with a set of linear $N^{th}$ order state-space equations based on the Euler-Bernoulli beam model with clamped-free boundary conditions (damping has been ignored) and can be found in [9]. A simplified model is given in (30) which models the rigid body and the first flexural mode of vibration.

$$\begin{Bmatrix} \dot{\theta} \\ \dot{w} \\ \ddot{\theta} \\ \ddot{w} \end{Bmatrix} = \begin{bmatrix} 0 & 0 & 1 & 0 \\ 0 & 0 & 0 & 1 \\ 0 & \frac{M_1 \omega_1^2 \rho A_b}{\rho A_b (I_h + I_b) - M_1^2} & 0 & 0 \\ 0 & \frac{-\rho A_b (I_h + I_b) \omega_1^2}{\rho A_b (I_h + I_b) - M_1^2} & 0 & 0 \end{bmatrix} \begin{Bmatrix} \theta \\ w \\ \dot{\theta} \\ \dot{w} \end{Bmatrix} + \begin{bmatrix} 0 \\ 0 \\ \frac{\rho A_b}{\rho A_b (I_h + I_b) - M_1^2} \\ \frac{-M_1}{\rho A_b (I_h + I_b) - M_1^2} \end{bmatrix} \tau \quad (30)$$

$$y = \begin{bmatrix} l & 2 & 0 & 0 \end{bmatrix} \begin{Bmatrix} \theta \\ w \\ \dot{\theta} \\ \dot{w} \end{Bmatrix}$$

The physical parameters for the model used in the work are as follows: beam length (1) 1 m, beam linear mass density ($\rho A_b$) 0.233 kg/m, beam moment of inertia ($I_b$) 0.078 kgm$^2$, motor hub inertia including the camera ($I_h$)

0.005 kgm², and the first natural frequency ($\omega_1$) of the flexible link is 17.445 rad/s.

Initially, a linear state feedback controller was designed using linear quadratic optimal control techniques. Based on the rigid body performance ($\theta$) and the overall beam tip position ($\theta$l+w), the state weighting matrix Q was chosen such that trace Q=|100 1 1 10| and the output weighting R was chosen as unity. The resulting state feedback gain vector was computed as k=|10.000 −27.641 1.921 −0.401|. Note that the controller is implemented as a tracking controller such that the first state is actually the error signal (i.e. $\theta_{REF}-\theta$). Converting the state feedback controller to a fuzzy controller requires the structure of the FAM to be selected. The FAM structure essentially refers to the antecedent part of the rules and this becomes an issue since an n input controller can be structured n different ways. In order to exemplify this concept, consider the state feedback gain vector that was given above. The controller output is computed as $u=k_1\theta+k_2w+k_3\dot\theta+k_4\dot w$ which would correspond to a single FAM where each of the rules are composed with four antecedents. Although this approach provides maximum flexibility in terms of having access to the control actions in any part of the state-space, it also requires the maximum number of total rules for the FAM to be complete i.e. if each of the states is mapped to $\eta_{1,\ldots,n}$ fuzzy sets, then a complete FAM would require $$\prod_{i=1}^{4} \eta_i.$$

To simplify the design of an equivalent fuzzy controller, the state feedback controller could be considered as the sum of two separate controllers such that $u=u_1+u_2$ where $u_1=k_1\theta+k_3\dot\theta$ and $u_2=k_2w+k_4\dot w$. This would require two FAMs where the rules only have two antecedents and the total number of rules for complete FAMs is $\eta_1\times\eta_3+\eta_2\times\eta_4$. Although this approach is more restrictive in terms of possible FAM modifications, a pair of two dimensional FAMs is much easier to adjust heuristically than a much larger four dimensional FAM. Hence, the fuzzy controller design will incorporate two controllers whose outputs will be summed to produce the final output. The notion of a two phase approach is similar to work that was performed on a flexible manipulator presented in [10].

The first component of the equivalent fuzzy controller utilises five fuzzy sets per input to characterise the two input states $\theta$ and $\dot\theta$ so that the complete FAM has 25 rules. The second controller component maps the beam deflection w with five fuzzy sets while the deflection speed $\dot w$ is spanned by three fuzzy sets and requires 15 rules in the FAM. All of the input sets are equally spaced in their universes of discourse, normalised (i.e. span the space from −1 to +1), and triangular in shape, and overlap adjacent sets at a membership grade of 0.5. Scaling for these sets ensures that the expected ranges of the plant states will lie within the space spanned by the fuzzy sets. The scaling for the four states is |1.2 rad 0.04 m 5.0 rad/s 2.0 m/s|. The input sets are designated by $A_i^j$ where i indicates the state and j indicates the input set. Thus, the five input sets for state one are given as $A_1^{-2}, A_1^{-1}, A_1^0, A_1^1, A_1^2$ where the sets have been labelled from −2 to 2 rather than from 1 to 5 so that their position in the state space would be related to the set number. Similarly, the output sets for controller 1 are given as $B^{-12}, \ldots, B^0, \ldots, B^{12}$. The resulting two FAMs are given in Table 2.

Simulations show that the response of the two-part fuzzy controller is identical to that of the state feedback controller, as predicted by the above theorem. Perhaps more importantly, FAM1 and FAM2 provide an innovative means to view the "rules" that the optimal state feedback controller uses to determine its output. This ability opens the door to potential performance enhancement of the linear controller in specific parts of the state-space.

Figure 2:
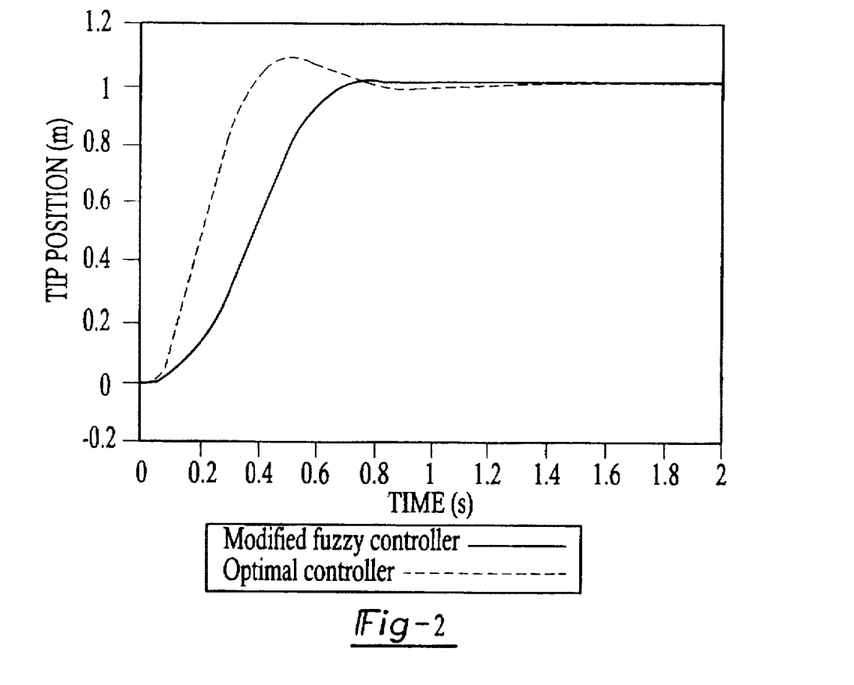
FIG. 2 is a graph showing a comparison between a tip position of a fuzzy controller and an optimal linear controller.
Figure 3:
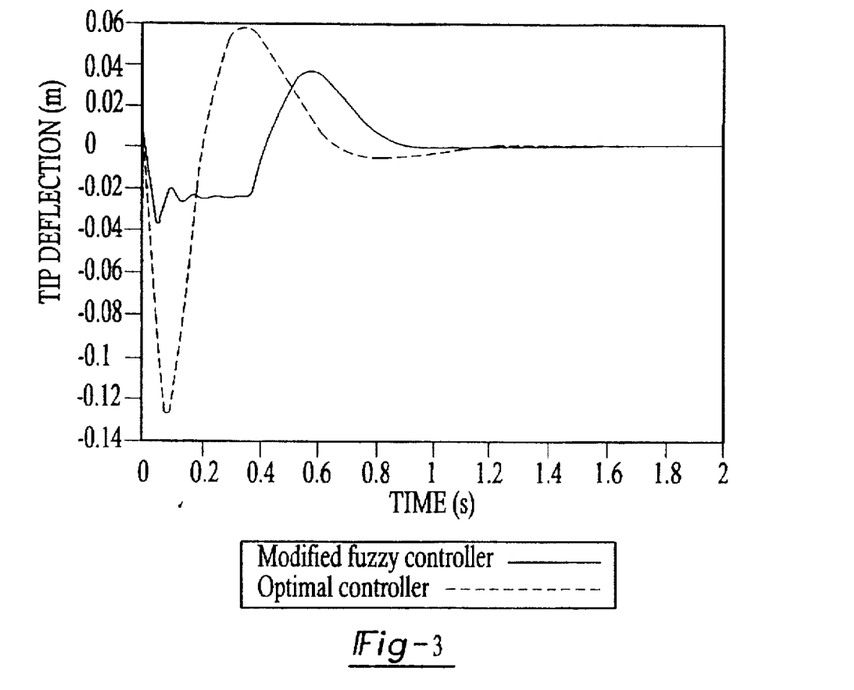
FIG. 3 is a graph showing a comparison of tip deflection for a fuzzy controller and an optimal linear controller.

In the case of the flexible link manipulator, the control actions of the linear controller are intuitively correct except for a few areas on the control surface of FAM1. These occur when the error is sufficiently large so that it does not have membership in the set $A_1^0$ (or the approximately zero set) and the rate of change of this state is near to zero. Thus, during these conditions, the arm is relatively far from its set-point and is moving slowly or not at all. The optimal controller acts by commanding a large torque to reduce the error although this action results in a significant deflection of the beam. Under these conditions it would be more appropriate to initiate motion of the arm in a more gentle manner so that vibrations are avoided. This would simply require choosing output consequences for the appropriate rules that were closer to the origin. This proposition is shown in FAM1 by the B terms that are in brackets. The net tip motion of the arm for the two control strategies is shown in FIG. 2 where the solid line is the modified fuzzy controller and the dashed line is the optimal controller response. Although the linear controller has a faster rise time, it also has greater overshoot. The settling times for both controllers however, are approximately the same. Significant differences however, can be found in the actual deflection of the tip of the arm which is shown in FIG. 3 where the solid line is the response of the fuzzy controller and the dashed line is that of the linear controller. The initial tip deflection with the fuzzy controller is less than 4 cm while that of the optimal controller is nearly 13 cm. The secondary overshoot is also reduced with the fuzzy controller by more than 2 cm over the optimal controller. Thus, the few modifications to the fuzzy controller produced a significant improvement in the overall performance of the initial optimal control law. The only potential weakness of the modified fuzzy controller is that global stability can no longer be guaranteed however, local stability is maintained.

TABLE 2

| Optimal control FAMs | | | |
|---|---|---|---|
| FAM1 | | FAM2 | |
| $A_1^{-2},A_3^{-2};B^{-12}$ | $A_1^{-2},A_3^{-2};B^4$ | $A_2^{-2},A_4^{-1};B^7$ | $A_2^{-2},A_4^{-1};B^{-4}$ |
| $A_1^{-2},A_3^{-1};B^{-11}$ | $A_1^{-2},A_3^{-1};B^7$ | $A_2^{-2},A_4^0;B^5$ | $A_2^{-2},A_4^0;B^1$ |
| $A_1^{-2},A_3^0;B^{-9}$ (B$^{-1}$) | $A_1^{-2},A_3^0;B^{-3}$ | $A_2^{-2},A_4^1;B^2$ | $A_2^{-2},A_4^1;B^{-3}$ |
| $A_1^{-2},A_3^1;B^{-6}$ (B$^{-1}$) | $A_1^{-2},A_3^1;B^1$ | $A_2^{-1},A_4^{-1};B^6$ | $A_2^{-1},A_4^{-1};B^{-6}$ |
| $A_1^{-2},A_3^2;B^{-2}$ | $A_1^{-2},A_3^2;B^5$ (B$^1$) | $A_2^{-1},A_4^0;B^3$ | $A_2^{-1},A_4^0;B^{-2}$ |
| $A_1^{-1},A_3^{-2};B^{-10}$ | $A_1^{-1},A_3^{-2};B^8$ | $A_2^{-1},A_4^1;B^{-1}$ | $A_2^{-1},A_4^1;B^{-5}$ |
| $A_1^{-1},A_3^{-1};B^{-8}$ | $A_1^{-1},A_3^{-1};B^{10}$ | $A_2^0,A_4^{-1};B^4$ | $A_2^0,A_4^{-1};B^{-7}$ |
| $A_1^{-1},A_3^0;B^{-5}$ (B$^1$) | $A_1^{-1},A_3^0;B^2$ | $A_2^0,A_4^0;B^0$ | |
| $A_1^{-1},A_3^1;B^{-1}$ | $A_1^{-1},A_3^1;B^6$ (B$^1$) | | |
| $A_1^{-1},A_3^2;B^3$ | $A_1^{-1},A_3^2;B^9$ (B$^1$) | | |
| $A_1^0,A_3^{-2};B^{-7}$ | $A_1^0,A_3^{-2};B^{11}$ | | |
| $A_1^0,A_3^{-1};B^{-4}$ | $A_1^0,A_3^{-1};B^{12}$ | | |
| $A_1^0,A_3^0;B^0$ | | | |

5. Advanced Linear/Fuzzy Control

The work contained in this paper establishes an algorithmic approach to constructing a fuzzy controller based on linear techniques and this result is proved analytically. Although the corresponding theorem and proof were based on the time-varying linear control law given in (13), more general dynamic linear controllers could also be mapped to a fuzzy controller using the same methodology. For example, consider a plant given by the linearised state-space representation $$\dot{x}=A(t)x+B(t)u \quad (31)$$

$$y=C(t)x+D(t)u$$

and a dynamic controller in the feedback path given by $$\dot{e}=E(t)e+F(t)y \quad (32)$$

$$v=G(t)e+H(t)y$$

In this general form (which includes all proper transfer functions), the top equation in (32) can be regarded as a state-estimator which generates scaled versions of the plant states. The bottom equation can be considered as the controller. Thus, in terms of the original formulation (25), then $K(t)=|G(t)H(t)|$ and $z^T=|e\ y|$; this can be cast into a fuzzy framework as before. Note that this approach encompasses virtually all linear controllers.

6. Applications of Deterministic Fuzzy Control

The fuzzy control route is only beneficial if modifications to the fuzzified linear controller lead to improved performance. This rationale can manifest itself in many ways, a few of which, are given below:

1) Selective Rule Modification: A given linear controller may not provide control actions which are globally correct in an intuitive sense due to modelling approximations. Thus, a few rules may require adjustment as exemplified in section 4.

2) Fuzzy Reasoning away from the Operating Point: The linear control law may function adequately in the neighbourhood of the operating point although heuristics may provide better performance elsewhere. In this case the linear controller would be fuzzified with the input sets spanning the effective neighbourhood. Additional input sets would then be added outside of those sets already in place and the FAM would be expanded based on intuitive reasoning. In this way, linear control is guaranteed near the origin while heuristics dictate the control elsewhere. The advantage of this approach is that the entire controller is embodied in a single fuzzy controller. More importantly, fuzzy controller constructed in this way guarantees local stability.

3) Localised Nonlinear Plant Behaviour: Often localised nonlinearities hamper the performance of linear controllers. As an example, consider a phenomena commonly referred to as stiction which is a problem related to the static coefficient of friction being significantly higher than the dynamic friction coefficient. Hence, stiction is usually most problematic near the origin where velocities are near zero and proportional components provide a small net control effort. In this case, a linear controller could be designed for the linearised system and then fuzzified using several fuzzy sets to span each of the inputs. One way to deal with the stiction would then be to adjust the FAM around the origin so that the output sets provide a larger net control effort to overcome the friction in the plant.

4) Multiple Operating Points: In the case that a system has several operating points where performance requirements dictate a different linear control law at each operating point, a single fuzzy controller could suffice. For this situation each of the linear controllers could be fuzzified as specified in this paper and the resulting FAMs amalgamated into one larger FAM. Since each of the smaller FAMs produces their own output sets, the desired linear performance will be guaranteed in the neighbourhood of the operating points.

5) Fuzzy Controller Prototyping: Perhaps one of the most useful applications of the method presented in this paper is using it to prototype a fuzzy controller. If a linear controller exists for a given system (e.g. PID), then as demonstrated previously, conversion to a fuzzy controller is straight forward and the performance is guaranteed to be identical to that of the linear controller. Thus, the linear controller could be replaced with an equivalent fuzzy controller with no down-time. Even if a linear controller does not exist, one could be designed based on a simple linearised plant model using one of several conventional techniques. Although the initial performance may be inadequate, the basic components of the fuzzy controller will be in place. Simulations with the linear controller will also provide insight into the expected magnitudes of the input states so that the input sets can be scaled appropriately.

7. Summary and Conclusions

A method is presented in this paper which proves that a broad class of linear controllers (any linear controller with a proper transfer function) can be directly converted to fuzzy controller form. The result is exact in the sense that the defuzzified controller output is in fact, the linear control law. It is important to point out that this result applies when as few as two fuzzy sets are used to span the universe of discourse of each of the inputs. The results of lemma 1 are important for implementation since it proves that the computational cost of fuzzy control can be significantly reduced when a complete FAM is utilised with input membership functions that satisfy commonly used criteria.

The conversion algorithm basically requires four steps, provided that the linear controller already exists, and are re-capped as follows:

i) The input sets must be normal, triangular in shape with an overlap at a membership grade of 0.5, and completely bound the corresponding states i.e. $\overline{A}_i^0 \leq z_i \leq \overline{A}_i^{\eta_i-1}$.

ii) The fuzzy associative memory must be complete meaning that a rule exists for every possible combination of the input sets. In addition, a different output set is required for each rule.

iii) The output sets are computed based on the linear control law as shown in (13).

iv) The defuzzified output is based on singleton fuzzification and product inferencing as given in (9). Recall that steps i) and ii) render the denominator of (9) equal to unity as proved in Lemma 1.

Perhaps one of the most practical benefits of this approach is that the majority of linear controllers presently in use could be replaced with equal performing fuzzy controllers without incurring any down time. Expert knowledge could then be incorporated into the FAM for improved performance while local stability is maintained. It is expected therefore that the deterministic technique presented for constructing a fuzzy controller should allow much faster prototyping of fuzzy systems provided that a linear controller is initially available.

APPENDIX

This appendix contains the proofs of Lemmas 1 and 2.

Proof of Lemma 1

Condition ii) can only be satisfied with membership functions that overlap at a membership grade of 0.5. Thus, for a given input vector z, only two membership functions per input could have non-zero membership grades. Therefore, only two fuzzy sets for each input need be considered i.e. $\eta_i=2$ $\forall i$. Now, if the expression for $y^p$ is expanded, it can be presented as (arguments omitted):

$$y^p = \mu_{A_1}^0 \mu_{A_2}^0 \cdots \mu_{A_{d-1}}^0 \mu_{A_n}^0 + \mu_{A_1}^0 \mu_{A_2}^0 \cdots \mu_{A_{d-1}}^0 \mu_{A_n}^1 + \ldots + \quad (33)$$

$$\mu_{A_1}^1 \mu_{A_2}^1 \cdots \mu_{A_{d-1}}^1 \mu_{A_n}^0 + \mu_{A_1}^1 \mu_{A_2}^1 \cdots \mu_{A_{d-1}}^1 \mu_{A_n}^1.$$

Notice that the $n^{th}$ term of each group can be factored from every successive two groups such that:

$$y^D = \mu_{A_1}{}^0 \mu_{A_2}{}^0 \ldots \mu_{A_{n-2}} \mu_{A_{n-1}}(\mu_{A_n}{}^0 + \mu_{A_n}{}^1) + \quad (34)$$

$$\mu_{A_1}{}^0 \mu_{A_2}{}^0 \ldots \mu_{A_{n-2}} \mu_{A_{n-1}}(\mu_{A_n}{}^0 + \mu_{A_n}{}^1) + \ldots +$$

$$\mu_{A_1}{}^1 \mu_{A_2}{}^1 \ldots \mu_{A_{n-2}} \mu_{A_{n-1}}(\mu_{A_n}{}^0 + \mu_{A_n}{}^1) +$$

$$\mu_{A_1}{}^1 \mu_{A_2}{}^1 \ldots \mu_{A_{n-2}} \mu_{A_{n-1}}(\mu_{A_n}{}^0 + \mu_{A_n}{}^1).$$

Now the n−1 term can be factored in groups of two and so on until all the terms have been completely factored which leaves:

$$y^D = (\mu_{A_1}{}^0 + \mu_{A_1}{}^1)(\mu_{A_2}{}^0 + \mu_{A_2}{}^1) \ldots (\mu_{A_{n-1}}{}^0 + \mu_{A_{n-1}}{}^1)(\mu_{A_n}{}^0 + \mu_{A_n}{}^1). \quad (35)$$

However, from condition ii), each of the terms in (35) is equal to one:

$$\therefore y^D = 1. \blacksquare$$

Proof of Lemma 2

As in the proof of Lemma 1, the input membership functions must overlap at a membership grade of 0.5. Thus, given an input vector $z \in \mathbb{R}$, only two membership functions per input will have non-zero membership grades.

Now, from Lemma 1 it can be easily seen that the defuzzified output can be found by simply evaluating the numerator of (9) since $y_0 = y^N + 1 = y^N$. If the contributing portion of the FAM ($\mu_{A_j}(z_i) \neq 0 \; \forall i$) is applied to this equation, the general form will be as given in (24). Note that equations (17) and (22) can be generated from (24) for the conditions given. Thus, the objective of this proof is show that (24) is a general formulation.

Assume that (24) holds for n=N. Now consider the case where n=N+1 (proof by induction). Substitute into (9) and expand noting that since all the membership functions are functions of the input z, the argument will be omitted for clarity:

$$y_0^{(N+1)} = \bar{B}^0 \mu_{A_1}{}^0 \mu_{A_2}{}^0 \ldots \mu_{A_N}{}^0 \mu_{A_{N+1}}^0 + \quad (36)$$

$$\bar{B}^1 \mu_{A_1}{}^0 \mu_{A_2}{}^0 \ldots \mu_{A_N}{}^0 \mu_{A_{N+1}}^1 +$$

$$\ldots + \bar{B}^N \mu_{A_1}{}^1 \mu_{A_2}{}^0 \ldots \mu_{A_N}{}^0 \mu_{A_{N+1}}^0 + \ldots +$$

$$\bar{B}^{2^{N+1}-2} \mu_{A_1}{}^1 \mu_{A_2}{}^1 \ldots \mu_{A_N}{}^1 \mu_{A_{N+1}}^0 +$$

$$\bar{B}^{2^{N+1}-1} \mu_{A_1}{}^1 \mu_{A_2}{}^1 \ldots \mu_{A_N}{}^1 \mu_{A_{N+1}}^1$$

$$= \mu_{A_1}{}^0 [\bar{B}^0 \mu_{A_2}{}^0 \ldots \mu_{A_{N+1}}^0 + \bar{B}^1 \mu_{A_2}{}^0 \ldots \mu_{A_{N+1}}^1 +$$

$$\ldots + \bar{B}^{2^N-1} \mu_{A_2}{}^1 \ldots \mu_{A_{N+1}}^1] +$$

$$\mu_{A_1}{}^1 [\bar{B}^{2^N} \mu_{A_2}{}^0 \ldots \mu_{A_{N+1}}^0 + \ldots +$$

$$\bar{B}^{2^{N+1}-1} \mu_{A_2}{}^1 \ldots \mu_{A_{N+1}}^1]$$

Now let $\alpha_j^i \triangleq A_{j+1}^i$ for $i \in \{0,1\}$, $j \in \{0,1,\ldots,N\}$ and, $\beta^k \triangleq \bar{B}^{2^N+k}$ for $k \in \{0,1,\ldots,2^N-1\}$.

$$\therefore y_0^{(N+1)} = \mu_{A_1}{}^0 [\bar{B}^0 \mu_{\alpha_1}{}^0 \ldots \mu_{\alpha_N}{}^0 + \quad (37)$$

$$\bar{B}^1 \mu_{\alpha_1}{}^0 \ldots \mu_{\alpha_N}{}^1 + \ldots + \bar{B}^{2^N-1} \mu_{\alpha_1}{}^1 \ldots \mu_{\alpha_N}{}^1] +$$

$$\mu_{A_1}{}^1 [\beta^{2^N} \mu_{\alpha_1}{}^0 \ldots \mu_{\alpha_N}{}^0 + \ldots + \beta^{2^N-1} \mu_{\alpha_1}{}^1 \ldots \mu_{\alpha_N}{}^1]$$

The terms in the brackets can be put into the same form as that of (24), thus, $$y_0^{(N+1)} = \mu_{A_1}{}^0 \left[ \bar{B}^{2^N-1} + \sum_{i=1}^{N} (\bar{B}^{2^N-1-2^{N-i}} - \bar{B}^{2^N-1}) \mu_{\alpha_i}{}^0 \right] + \quad (38)$$

$$\mu_{A_1}{}^1 \left[ \beta^{2^N-1} + \sum_{i=1}^{N} (\beta^{2^N-1-2^{N-i}} - \beta^{2^N-1}) \mu_{\alpha_i}{}^0 \right]$$

and if condition ii) is applied, the result is:

$$y_0^{(N+1)} = \mu_{A_1}{}^0 \left[ \bar{B}^{2^N-1} + \sum_{i=1}^{N} (\bar{B}^{2^N-1-2^{N-i}} - \bar{B}^{2^N-1}) \mu_{\alpha_i}{}^0 \right] + \quad (39)$$

$$(1 - \mu_{A_1}{}^0) \left[ \beta^{2^N-1} + \sum_{i=1}^{N} (\beta^{2^N-1-2^{N-i}} - \beta^{2^N-1}) \mu_{\alpha_i}{}^0 \right].$$

Rearranging leads to $$y_0^{(N+1)} = (\bar{B}^{2^N-1} - \beta^{2^N-1}) \mu_{A_1}{}^0 + \sum_{i=1}^{N} (\bar{B}^{2^N-1-2^{N-i}} - \quad (40)$$

$$\bar{B}^{2^N-1} - \beta^{2^N-1-2^{N-i}} + \beta^{2^N-1}) \mu_{A_1}{}^0 \mu_{\alpha_i}{}^0 +$$

$$\beta^{2^N-1} + \sum_{i=1}^{N} (\beta^{2^N-1-2^{N-i}} - \beta^{2^N-1}) \mu_{\alpha_i}{}^0$$

$$= \bar{B}^{2^{(N+1)}-1} + (\bar{B}^{2^N-1} - \bar{B}^{2^{(N+1)}-1}) \mu_{A_1}{}^0 +$$

$$\sum_{i=1}^{N} (\bar{B}^{2^{(N+1)}-1-2^{N-i}} - \bar{B}^{2^{(N+1)}-1}) \mu_{A_{i+1}}{}^0 +$$

$$\sum_{i=1}^{N} \underbrace{(\bar{B}^{2^N-1-2^{N-i}} - \bar{B}^{2^N-1} - \bar{B}^{2^{(N+1)}-1-2^{N-i}} + \bar{B}^{2^{(N+1)}-1})}_{d_i} \mu_{A_1}{}^0 \mu_{A_{i+1}}{}^0.$$

Note however, if $d_i$ is examined, it becomes apparent that it is equal to zero. This can be shown by rearranging $d_i$ as $$d_i = (\bar{B}^{2^N-1-2^{N-i}} - \bar{B}^{2^{(N+1)}-1-2^{N-i}}) - (\bar{B}^{2^N-1} - \bar{B}^{2^{(N+1)}-1}). \quad (41)$$

In order to show that this term is equal to zero, recall that the $\bar{B}$ terms are defined in (13) based on a numbering system where the superscript is the base 10 equivalent of the binary number formed by the superscripts of the $\bar{A}^b$ terms aligned sequentially. Notice that the superscripts of the first two terms in (41) are identical except that the second term is farther in the sequence by a power of 2. This means that the resulting bit pattern will only differ in the most significant bit so that the difference in the two terms leaves only $k_0 \bar{A}_1{}^0 - k_0 \bar{A}_1{}^1$. Similarly, the third and fourth terms of (41) are also offset by a single power of 2 which also results in a difference of $k_0 \bar{A}_1{}^0 - k_0 \bar{A}_1{}^1$. Thus, the net difference between the two bracketed expressions leaves $d_i = 0 \; \forall i$. Since $d_i = 0$, then the defuzzified output becomes $$y_0^{(N+1)} = \bar{B}^{2^{(N+1)}-1} + (\bar{B}^{2^N-1} - \bar{B}^{2^{(N+1)}-1}) \mu_{A_1}{}^0 + \quad (42)$$

$$\sum_{i=1}^{N} (\bar{B}^{2^{(N+1)}-1-2^{N-i}} - \bar{B}^{2^{(N+1)}-1}) \mu_{A_{i+1}}{}^0$$

and further simplification leads to:

$$y_0^{(N+1)} = \bar{B}^{2^{(N+1)}-1} + \sum_{i=1}^{(N+1)} (\bar{B}^{2^{(N+1)}-1-2^{N-i}} - \bar{B}^{2^{(N+1)}-1}) \mu_{A_i}{}^0. \quad (43)$$

which is identical in form to (24). ∎

I claim:

1. A method of constructing multi-input fuzzy controllers for a microprocessor based control system, said system controlling a plant, said method being based on a finite dimensional linear controller for said system, said method comprising:

(a) choosing input membership functions so that a sum of membership grades for a particular input will be unity and each membership grade will vary linearly with the input over the range of that particular membership function, wherein a first membership function has a first membership grade which is non-symmetrical about a maximum membership grade;

(b) choosing a fuzzy associative memory so that it encompasses all possible combinations of input sets;

(c) choosing output membership functions as functions of equal area; and (d) using said microprocessor to calculate a defuzzified output based on singleton fuzzification, product inferencing and centroidal defuzzification;

thereby converting said linear controller to an equivalent fuzzy controller.

2. A method as claimed in claim 1 wherein a rule exists for every possible combination of input sets in the fuzzy associative memory and each rule has a separate output set.

3. The method of claim 1 wherein said input membership functions include said first membership function, an adjacent second membership function and a third membership function adjacent said second membership function, said second membership function between said first and third membership functions, said step (b) further including the steps of:

choosing said first membership function and said second membership function each having a maximum membership grade separated by a first value;

choosing said third membership function to have a maximum membership grade which is separated from said second maximum membership grade by a second value different from said first value.

4. A method as claimed in claim 2 wherein the output sets are based on linear control law.

5. A method as claimed in claim 4 wherein the input sets are normal, triangular in shape with an overlap at a membership grade of 0.5.

6. A method as claimed in claim 5 wherein the singleton fuzzification and product inferencing for each output in accordance with the equation:

$$y_0(u) = \frac{\sum_{l=1}^{M} \overline{B}^l \left( \prod_{i=1}^{n} \mu_{A_i^l}(u_i) \right)}{\sum_{l=1}^{M} \left( \prod_{i=1}^{n} \mu_{A_i^l}(u_i) \right)}$$

where $y_0(u)$ is the control action;

u is the input vector;

$\overline{B}^l$ is the centroid of the output set for rule l of each output;

n is the number of inputs;

$u_i$ is the elements of the input vector;

M is the number of rules in the fuzzy associative measures;

$\mu_A(u_i)$ is a membership grade for input i on rule l; and a denominator of the equation is equal to one.

7. A method of constructing multi-input fuzzy controllers for a microprocessor based control system, said system controlling a plant, said method being based on a finite dimensional linear controller for said system, said method comprising:

(a) choosing input membership functions so that a sum of membership grades for a particular input will be unity and each membership grade will vary linearly with the input over the range of that particular membership function;

(b) choosing a fuzzy associative memory so that it encompasses all possible combinations of input sets, and so that a rule exists for every possible combination of input sets in the fuzzy associative memory and each rule has a separate output set, said output sets are based on linear control law, the input sets are normal, triangular in shape with an overlap at a membership grade of 0.5;

(c) choosing output membership functions as symmetrical unimodal functions of equal area; and (d) using said microprocessor to calculate a defuzzified output based on singleton fuzzification, product inferencing and centroidal defuzzification, the singleton fuzzification and product inferencing for each output in accordance with the equation:

$$y_0(u) = \frac{\sum_{l=1}^{M} \overline{B}^l \left( \prod_{i=1}^{n} \mu_{A_i^l}(u_i) \right)}{\sum_{l=1}^{M} \left( \prod_{i=1}^{n} \mu_{A_i^l}(u_i) \right)}$$

where $y_0(u)$ is the control action;

u is the input vector;

$\overline{B}^l$ is the centroid of the output set for rule l of each output;

n is the number of inputs;

$u_i$ is the elements of the input vector;

M is the number of rules in the fuzzy associative measures;

$\mu_A(u_i)$ is a membership grade for input i on rule l; and a denominator of the equation is equal to one;

wherein the linear controller satisfies the equation:

where $y_0$ is the control action;

K(t) is a time varying gain matrix;

z(x) is a vector of any linear function of the plant states;

c(t) is a time varying offset vector and the input membership functions are triangular and the membership grades corresponding to the membership function are calculated as:

$$\mu_{A_i^0}(z_i) = \frac{\overline{A}_i^1 - z_i}{\overline{A}_i^1 - \overline{A}_i^0} = 1 - \mu_{A_i^1}(z_i), i \in \{1,2,\ldots,n\}$$

where $z_i$ is equal to u;

$\overline{A}_i^0$ is the centroid of the first membership function of input i with a non-zero membership grade;

$\overline{A}_i^1$ is the centroid of the second membership function of input i with a non-zero membership grade;

making the sum of the membership grades equal to one and the fuzzy associative memory contains all possible combinations of the input sets such that the number of unique rules is:

where n is the number of inputs;

$\eta_i$ is the number of sets spanning input i and is a positive integer >1;

the centroids of the output sets for each output are based on the linear control law of the equation $y_0 = K(t)z(x)+c(t)$ and are determined for the first and second membership functions with the non-zero membership grades in accordance with the equation:

$$\bar{B}^0(t) = k_1(t)\bar{A}_1{}^0 + k_2(t)\bar{A}_2{}^0 + \ldots + k_n(t)\bar{A}_n{}^0 + c(t)$$

$$\bar{B}^1(t) = k_1(t)\bar{A}_1{}^0 + k_2(t)\bar{A}_2{}^0 + \ldots + k_n(t)\bar{A}_n{}^1 + c(t)$$

$$\bar{B}^2(t) = k_1(t)\bar{A}_1{}^0 + k_2(t)\bar{A}_2{}^0 + \ldots k_{n-1}(t)\bar{A}_{n-1}^1 + k_n(t)\bar{A}_n{}^0 + c(t)$$

$$\ldots$$

$$\bar{B}^{2^n-2}(t) = k_1(t)\bar{A}_1{}^1 + k_2(t)\bar{A}_2{}^1 + \ldots + k_{n-1}(t)\bar{A}_{n-1}^1 + k_n(t)\bar{A}_n{}^0 + c(t)$$

$$\bar{B}^{2^n-1}(t) = k_1(t)\bar{A}_1{}^1 + k_2(t)\bar{A}_2{}^1 + \ldots + k_{n-1}(t)\bar{A}_{n-1}^1 + k_n(t)\bar{A}_n{}^1 + c(t)$$

where $\bar{B}$ is the centroid of the output set for rules $0 \ldots$ to $\ldots 2^n-1$ for each output; and $k_1(t) \ldots k_n(t)$ is the row in $k(t)$ corresponding to the particular output being dealt with.

8. A method as claimed in any one of claims 1, 6 or 7 wherein the controller has a multi-output including the step of repeating the method for each output.

9. A method as claimed in any one of claims 1, 6 or 7 including the step of further enhancing the fuzzy controller heuristically after it is created.

10. A method as claimed in any one of claims 1, 6 or 7 including the step of designing a finite dimensional linear controller.

11. A method of designing multi-input fuzzy controllers for a microprocessor based control system, said system controlling a plant, said method being based on a finite dimensional linear controller for said system, said method comprising:

(a) choosing input membership functions so that a sum of membership grades for a particular input will be unity and each membership grade will vary linearly with the input over the range of that particular membership function;

(b) choosing a fuzzy associative memory so that it encompasses all possible combination of input sets;

(c) choosing output membership functions as functions of equal area;

(d) calculating time-variant centroids of said output membership functions based upon said linear controller;

(e) using said microprocessor to calculate a defuzzified output based on singleton fuzzification and centroidal defuzzification; thereby converting said linear controller to an equivalent fuzzy controller.

12. The method of claim 11 wherein each of said centroids is calculated where all of said inputs have a membership grade of one.

13. A method as claimed in claim 11 wherein the singleton fuzzification and product inferencing for each output is in accordance with the equation:

$$y_0(u) = \frac{\sum\limits_{l=1}^{M} \bar{B}^l \left( \prod\limits_{i=1}^{n} \mu_{A_i^l}(u_i) \right)}{\sum\limits_{l=1}^{M} \left( \prod\limits_{i=1}^{n} \mu_{A_i^l}(u_i) \right)}$$

where $y_0(u)$ is the control action;

u is the input vector;

$\bar{B}^l$ is the centroid of the output set for rule l of each output;

n is the number of inputs;

$u_i$ is the elements of the input vector;

M is the number of rules in the fuzzy associative measures;

$\mu_A(u_i)$ is a membership grade for input i on rule l; and a denominator of the equation is equal to one.

14. A method of constructing a multi-input fuzzy controller for a control system controlling a plant, said method being based on a linear controller for said system, said method including the steps of:

(a) choosing input membership functions so that a sum of membership grades for a particular input will be unity and each membership grade will vary linearly with the input over the range of that particular membership function;

(b) choosing output membership functions as functions of equal area;

(c) calculating centroids of said output membership functions as singletons based upon said linear controller;

(d) calculating a defuzzified output based on centroidal defuzzification;

thereby converting said linear controller to an equivalent fuzzy controller.

15. The method of claim 14 wherein each of said centroids is calculated where all of said inputs have a membership grade of one.

* * * * *